United States Patent [19]

Schindel

[11] 4,452,342

[45] Jun. 5, 1984

[54] SHAFT BRAKING MECHANISM UTILIZING NON-PERMANENT DEFORMING BRAKE SHOE

[75] Inventor: Arnold Schindel, Fairlawn, N.J.

[73] Assignee: The Singer Company, Little Falls, N.J.

[21] Appl. No.: 349,874

[22] Filed: Feb. 18, 1982

[51] Int. Cl.³ .............................................. B62C 7/02
[52] U.S. Cl. .......................................... 188/69; 188/60
[58] Field of Search ..................... 188/69, 30, 60, 167, 188/251 A, 24.13, 73.1

[56] References Cited

U.S. PATENT DOCUMENTS

| | | | |
|---|---|---|---|
| 1,391,390 | 9/1921 | Knapp | 188/69 |
| 2,449,459 | 9/1948 | Eckert | 188/60 |
| 2,996,154 | 8/1961 | Vial | 188/69 |
| 3,698,690 | 10/1972 | Beaver | 188/69 |
| 3,732,951 | 5/1973 | Hata et al. | 188/24.13 |
| 3,892,295 | 7/1975 | Hahto | 188/69 |

FOREIGN PATENT DOCUMENTS 1378495  12/1974  United Kingdom ................. 188/30

Primary Examiner—Bruce H. Stoner, Jr.
Assistant Examiner—Alvin E. Oberley
Attorney, Agent, or Firm—Morris Liss; T. W. Kennedy

[57] ABSTRACT

A braking mechanism for a rotating shaft includes a corrugated wheel keyed to the shaft. A polyurethane pad mounted on a spring-biased plunger contacts the wheel corrugations creating non-permanent mating formations in the pad. Thus, upon contact between the two, the wheel and pad mesh thereby preventing wheel rotation until the pad is withdrawn.

2 Claims, 1 Drawing Figure

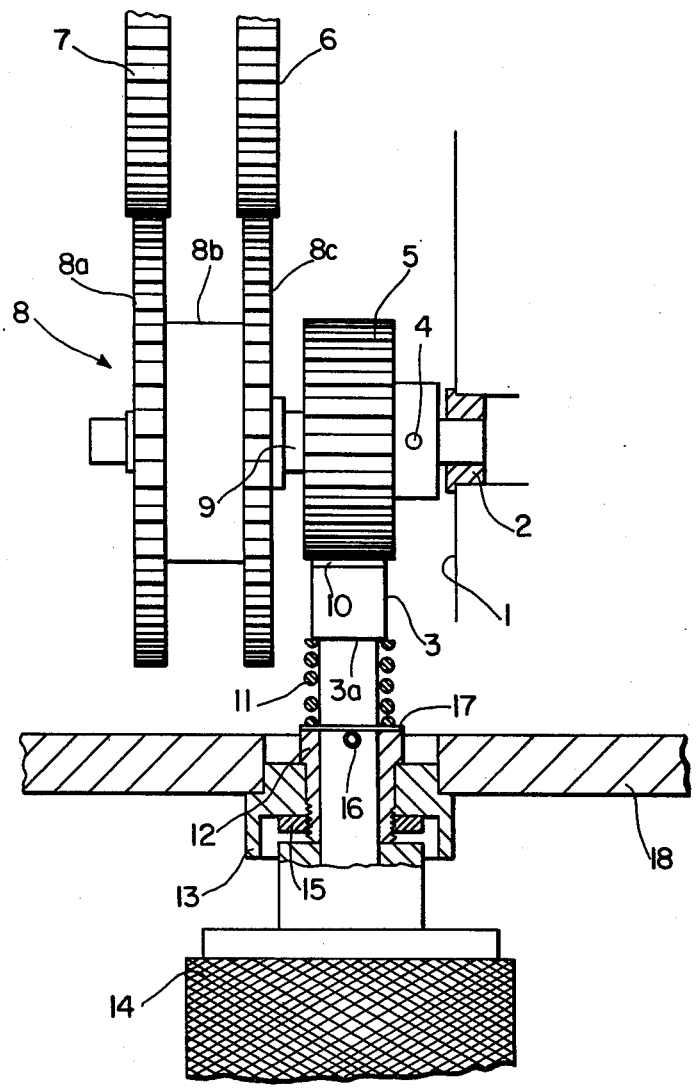

SHAFT BRAKING MECHANISM UTILIZING NON-PERMANENT DEFORMING BRAKE SHOE

FIELD OF THE INVENTION

The present invention relates to braking mechanisms and more particularly to a braking mechanism for a drive shaft. In the past, it has been common to utilize frictionally engaging members to permit braking of a rotatable shaft, particularly in smaller drives such as employed in servo mechanisms. In such applications, it is often necessary to stop a rotatable shaft in a position where it must be fixed for an indefinite period. Typical prior art frictional systems have been prone to "creep", especially on step inputs wherein inertial reactions must be quickly accommodated. A further problem resides in the fact that often a shaft drive and its associated braking mechanism are assembled within a housing where access becomes difficult. Thus, if an alignment of components is necessary, a time consuming service procedure must be dealt with. In the instance where size of the system necessitates a fragile shaft, there is a need to limit the amount of braking force so that deformation or fracture of the shaft does not occur.

BRIEF DESCRIPTION OF THE PRESENT INVENTION

The present invention obviates the problems encountered by prior art braking mechanisms of the frictional type. A rotatable shaft has a corrugated wheel keyed thereto. A polyurethane pad, mounted on a spring-biased plunger, contacts the corrugated wheel and, upon such contact, the pad develops non-permanent mating corrugations. Thus, as long as engagement continues between the pad and the wheel, rotation of the wheel and the shaft keyed thereto is prevented. By withdrawing the pad against a spring bias, the shaft may be rotated. Accordingly, once the position of the shaft is set by applying the braking mechanism, "creep" will not occur. In the application for servo mechanisms, this prevents faulty operation.

The applicant is unaware of any similar type of braking mechanism, using such a non-permanent deformable pad. The closest prior art of which applicant is aware appears in U.S. Pat. No. 2,612,970 which issued to Discount on Oct. 7, 1952. This patent describes a brake assembly for rotary card files wherein a corrugated rubber wheel may be selectively positioned into engagement with a rotating drum. However, the rotating drum is a non-deforming solid component. Accordingly, the engagement is completely frictional and the aforementioned problems, which are avoided by the present invention, may still be encountered.

Although the following description of the invention is discussed in connection with a corrugated wheel for braking shaft rotation, the invention is similarly intended for braking linear motion wherein a corrugated member may be connected to a member undergoing linear movement.

The above-mentioned objects and advantages of the present invention will be more clearly understood when considered in conjunction with the accompanying drawings, in which:

BRIEF DESCRIPTION OF THE FIGURE

The FIGURE is a partial sectional view of a braking mechanism in accordance with the present invention.

DETAILED DESCRIPTION OF THE INVENTION

Referring to the FIGURE, a rotatable shaft 9 is illustrated as being journaled in bearings 2, the latter being supported in the wall of a housing 1. In a preferred embodiment of the invention, an input gear 6 drives an output gear 7 via a differential gear cluster generally indicated by reference numeral 8. The differential gear cluster 8 is keyed to shaft 9 and the cluster includes a gear 8c which meshes with input gear 6 while output gear 7 meshes with differential gear 8a. Reference numeral 8b schematically illustrates the cluster components between gears 8a and 8c. This gearing assembly is not the invention per se and is merely illustrative.

The first portion of the braking mechanism includes a corrugated wheel 5 that has a step down collar section integrally connected to the wheel 5 and keyed, at 4, to shaft 9. As will be appreciated, if wheel 5 can be "locked" in place, shaft 9 will be unable to rotate. This locking is achieved by a non-permanent deformable brake pad 10 which may be selectively moved into position and withdrawn from meshing engagement with wheel 5. Upon contact of wheel 5, the material of pad 10 will conform to the corrugations to form mating corrugations. Inasmuch as pad 10 cannot rotate but is restrained to move perpendicularly to the axis of shaft 9, wheel 5 and shaft 9 keyed thereto cannot rotate.

The actuating mechanism for brake pad 10 includes a plunger 3 having a shoulder 3a formed therealong. Pin 16 is assembled into shaft 3 and engages a seat in collar 12 to prevent rotation of pad 10 and to ensure proper alignment of pad 10 and wheel 5. The collar 12 is received within bushing 13 which bears against support plate 18. A nut 15 which screws on collar 12 secures bushing 13 and collar 12 together.

A washer 17 is coaxially positioned along an intermediate length of the plunger and abuts the outward surface of collar 12. A helical spring 11 is positioned along the intermediate section of plunger 3 so that the ends of the spring respectively engage the annular shoulder 3a of the plunger and a confronting surface of washer 17. Spring 11 causes a biasing of the plunger and the attached brake pad 10 into meshing engagement with wheel 5. A knob 14 is appropriately fastened to an outer end of plunger 3 so that the plunger may be withdrawn against the resilient force of spring 11 to disengage the brake pad 10 from wheel 5 thereby allowing rotation of shaft 9.

Upon reapplication of the braking mechanism, the brake pad 10 will form new mating formations with the corrugations on wheel 5.

Shimming of the spring can be accommodated by changes in the thickness of washer 17. The upper illustrated end of the plunger, which mounts brake pad 10, is preferably formed in a concave fashion to permit maximum surface area contact between the brake pad 10 and wheel 5.

Although the brake pad 10 has been described in the preferred embodiment as being fabricated from polyurethane, this is by no means a limitation. Other suitable plastic or elastically deformable materials may be used, as long as the material has no "memory" and is capable of providing the mechanical locking action necessary to prevent motion of shaft 9.

As will be appreciated the invention is equally applicable to braking linear movement. If a member such as wheel 5 had its corrugations extending perpendicular to the direction of linear motion, pad 10 would be effective.

Due to the mechanical locking action of the described braking mechanism, the disadvantages of the prior art, such as the discussed "creep" are obviated. Further, alignment is minimized and infinite resolution is provided in a non-friction dependent environment.

It should be understood that the invention is not limited to the exact details of construction shown and described herein for obvious modifications will occur to persons skilled in the art.

I claim:

1. A braking mechanism for a moveable shaft having an input gear and an output gear for transmitting torque therebetween, said shaft being subject to vibration from the gears, the mechanism comprising:

first braking means including a brake wheel having permanent corrugated formations thereon and fixedly connected to the shaft;

second braking means movably mounted in adjacent proximity to the first means, the second braking means including:

a pad of non-permanent deformable material capable of developing formations that complement the permanent formations of the brake wheel upon contact therebetween and causing mechanical locking of the shaft until the pad is withdrawn from contact, a plunger for mounting the pad thereon for movement of the pad with the plunger between an on position and an off position; and a spring member for exerting an adjustable biasing force against the plunger to maintain contact between the corrugated brake wheel and the pad and to deform the pad in the on position and to permit manual withdrawal of the pad and plunger in the off position; and wherein the pad is fabricated from polyurethane to permit a selective deformation of the pad by a selected unit pressure from a reaction of the corrugated brake wheel.

2. The mechanism set forth in claim 1, wherein:

said plunger has shim means whereby adjustment of the spring force of the spring member is provided by substitution of one shim of a different thickness for another; and said plunger is journaled in a collar, said collar being removably connected to a bushing, said bushing being removably connected to a support plate for ease of assembly and overhaul.

* * * * *